July 7, 1942.   C. WEIDAUER   2,289,155
TOOL HOLDER
Filed Sept. 12, 1940
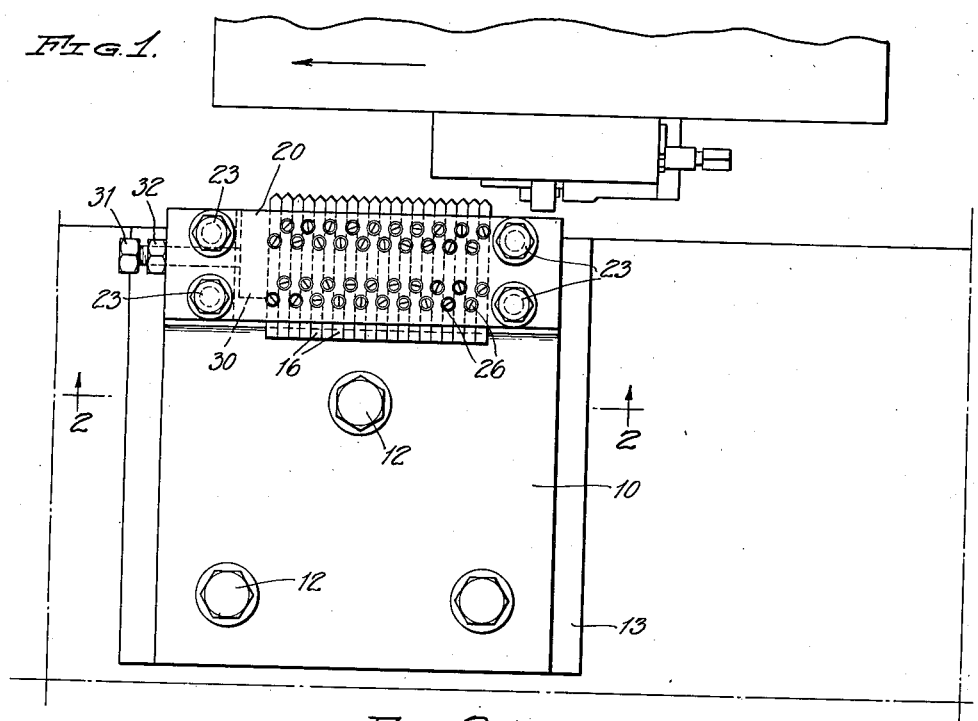
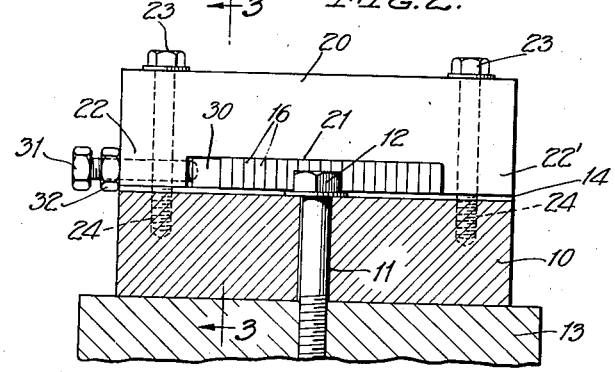
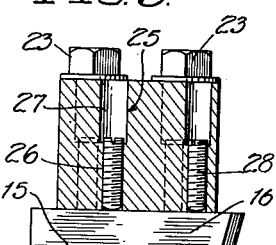
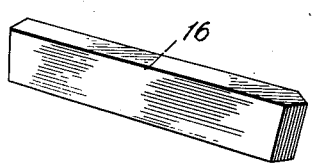
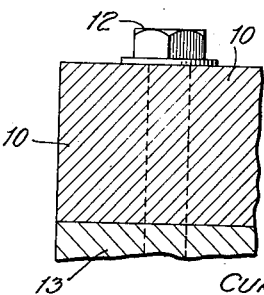
CURTIS WEIDAUER.
INVENTOR.
BY *Ely Pattison*
ATTORNEYS.

Patented July 7, 1942

2,289,155

UNITED STATES PATENT OFFICE 2,289,155

TOOL HOLDER

Curtis Weidauer, Manhasset, N. Y., assignor to Samuel Briskman, New York, N. Y.

Application September 12, 1940, Serial No. 356,435

5 Claims. (Cl. 29—97)

This invention relates to new and useful improvements in tool holders and more particularly it pertains to a tool holder for a plurality of cutting tools.

It is one object of the present invention to provide a tool holder in which a plurality of metal working tools may be retained in position relatively to the rotating spindle of a milling machine.

It is a further object of the invention to provide a tool holder in which each of a plurality of tools may be individually adjusted as occasion may require.

It is still a further object of the invention so to construct the tool holder that any one of a plurality of tools carried thereby may be adjusted without disturbing the adjustment of any of the remaining tools.

With the above and other objects in view, the nature of which will become apparent, reference will be had to the accompanying drawing in which, Figure 1 is a fragmentary top plan view of a rotary head milling machine illustrating a tool holder constructed in accordance with the present invention, in place thereon, Figure 2 is a transverse sectional view taken substantially on the line 2—2 of Figure 1, Figure 3 is a vertical sectional view partly broken away taken substantially on the line 3—3 of Figure 2, and;

Figure 4 is a perspective view of one of a plurality of tools employed in connection with the tool holder.

While a tool holder such as herein disclosed may have many uses, it is particularly adaptable for the formation of cutting edges upon the projecting teeth of pinking shear blades as described in the application of David L. Schwartz, Serial Number 346,090, filed July 18, 1940, for Method of making pinking shears.

A tool holder constructed in accordance with the present invention comprises a body portion 10 which, as illustrated in Figure 1, is preferably rectangular in form. This body portion has suitable openings 11 for the reception of bolts 12, of which three are herein illustrated, for securing the tool holder to the bed 13 of a milling, or other machine.

Extending transversely of one end of the body portion, there is a raised portion 14, the top face of which provides a seat 15 for a plurality of tools 16.

As illustrated in the drawing, there is a plurality of tools 16 and means for clamping said tools in position upon the tool seat 15 will now be described.

The tool clamping means consists of a block 20 which is adapted to overlie the tool seat, this block being of rectangular form and preferably of a length slightly less than the width of the body portion of the tool holder, as best illustrated in Figures 1 and 3.

Upon its under face, the clamping block 20 is recessed as at 21 which construction provides a pocket or the like for the reception of tools 16 resting upon the tool seat 15 heretofore mentioned. This construction also provides supporting feet or flanges 22 and 22' which support the clamping block 20 upon the body portion 10. Cap screws, bolts or the like 23 which pass through the clamping block and its supporting feet or flanges 22 and 22' and which have threaded engagement with internally threaded recesses 24 in the body portion 10, provide means for securing the clamping block 20 in position upon the body portion 10.

The clamping block 20 is provided with a plurality of passages 25 which extend entirely through the block from the top to the bottom thereof. As best illustrated in Figure 3, the lower portion of each of these passages is threaded as at 26 for threaded engagement with a bolt or the like 28, the upper or outer portions 27 of the passages having no thread and being of slightly larger diameter than the threaded portions thereof.

As best illustrated in Figure 1, the passages 25 are arranged in pairs and each pair of passages is staggered or off-set with respect to the next adjacent pair on each of its sides.

The tools 16 are relatively small and as illustrated in the drawing, the recess 21 upon the under face of the clamping block 20 is of sufficient length to accommodate several of these tools in side by side relation. The tools are of such cross sectional dimension that when in position in the recess 21 of the clamping block, each tool will underlie one pair of passages 25 in the clamping block with the result that each tool may be engaged upon its top face by two of the bolts 28 as illustrated in Figure 3.

Means is provided to insure proper positioning of the tools relatively to the pairs of passages 25 in the manner heretofore described and this means comprises a follower block or the like 30 which may be forced into engagement with one of the tools to move them as a group, by means of a bolt or the like 31. The bolt 31 has threaded engagement with the supporting foot or flange 22 of the clamping block 20 and through the medium of the follower block 30, forces the tools, as a group, into engagement with the supporting foot 22' clamping the tools between the follower block 30 and the supporting foot 22'. A jamb or lock nut 32 may be employed to prevent accidental displacement of the bolt 31.

From the foregoing, it will be obvious that means is provided by which the tools 16 may be individually adjusted and secured in their adjusted positions. Furthermore, the construction provides for removing the tool holder from the bed of a machine without necessarily disturbing the adjustment of the tools. Still further, the clamping block 20 may be removed from the body portion of the tool holder without disturbing the adjusted positions of the tools since they will be securely clamped between the follower block 30 and the supporting foot 22'.

From the foregoing, it will be apparent that the present invention provides a new and improved tool holder by means of which a plurality of cutting or similar tools may be individually adjusted and retained in their adjusted positions during operation of the tool.

While the invention has been herein illustrated in its preferred form, it is to be understood that it is not to be limited to the specific construction herein illustrated and that it may be practiced in such other forms as rightfully fall within the scope of the appended claims.

Having thus described the invention, what is claimed as new is:

1. A tool holder of the type described comprising a body portion of substantially rectangular form, a tool seat extending transversely of one end of the body portion, said tool seat being elevated with respect to the top face of the body portion, and means for securing a plurality of cutting tools in position upon the tool seat, said means comprising a clamping block having a tool receiving recess in its under face, means for removably securing the clamping block to the body portion, means for securing a plurality of tools between the clamping block and the body portion, and means cooperating with one of the side walls of the recess of the clamping block for clamping the tools as a group to the clamping block.

2. A tool holder of the type described comprising a body portion of substantially rectangular form, a tool seat extending transversely of the body portion at one end of the upper face thereof, a clamping block for securing a plurality of cutting tools upon the tool seat of the body portion, separate means for securing each of a plurality of tools between the clamping block and the tool seat, and a single means for clamping said tools in contacting relation with each other as a group to the clamping block.

3. A tool holder of the type described comprising a body portion of substantially rectangular form, a tool seat extending transversely of the body portion at one end of the upper face thereof, a clamping block for securing a plurality of cutting tools upon the tool seat of the body portion, said clamping block having a recess in its under face for the reception of a plurality of cutting tools, means for clamping a plurality of tools as a group in the recess of the clamping block, means for separately clamping a plurality of tools between the clamping block and the body portion, and means for securing the clamping block to the body portion of the tool holder.

4. A tool holder of the type described comprising a body portion having a raised tool seat at one end of the upper face thereof, a clamping block having a recess in its under face adapted to overlie and bridge the tool seat of the body portion, means for removably securing the clamping block to the body portion of the tool holder, means for individually securing a plurality of cutting tools between the clamping block and the tool seat of the body portion, and means for securing a plurality of tools as a group within the recess of the clamping block.

5. A tool holder of the type described comprising a body portion having a raised tool seat at one end of the upper face thereof, a clamping block having a recess in its under face adapted to overlie and bridge the tool seat of the body portion, means for removably securing the clamping block to the body portion of the tool holder, means for individually securing a plurality of cutting tools between the clamping block and the tool seat of the body portion, and means for securing a plurality of tools as a group within the recess of the clamping block, said last mentioned means including a follower block mounted in the recess and a bolt extending through one of the walls of the recess into engagement with the follower block for clamping the plurality of tools as a group between the follower block and one of the walls of the recess of the clamping block.

CURTIS WEIDAUER.